US011544231B1

(12) United States Patent
Kelley et al.

(10) Patent No.: US 11,544,231 B1
(45) Date of Patent: Jan. 3, 2023

(54) METHODS AND SYSTEMS FOR ALIGNING

(71) Applicant: The Boston Consulting Group, Inc., Boston, MA (US)

(72) Inventors: Kevin Kelley, Boston, MA (US); Stephen Brown, Boston, MA (US); Benjamin Stevenson, Boston, MA (US); Kurt Hendle, Boston, MA (US); Sarah Baxter, Boston, MA (US)

(73) Assignee: The Boston Consulting Group, Inc., Boston, MA (US)

( * ) Notice: Subject to any disclaimer, the term of this patent is extended or adjusted under 35 U.S.C. 154(b) by 0 days.

(21) Appl. No.: 17/459,246

(22) Filed: Aug. 27, 2021

Related U.S. Application Data

(63) Continuation of application No. 17/398,591, filed on Aug. 10, 2021, now abandoned, which is a continuation-in-part of application No. 17/384,258, filed on Jul. 23, 2021, now abandoned, and a continuation-in-part of application No. 16/013,535, filed on Jun. 20, 2018, now abandoned, and a continuation-in-part of application No. 16/013,535, filed on Jun. 20, 2018, now abandoned, which is a continuation of application No. 14/218,110, filed on Mar. 18, 2014, now Pat. No. 10,037,352.

(60) Provisional application No. 63/056,490, filed on Jul. 24, 2020, provisional application No. 61/802,884, filed on Mar. 18, 2013.

(51) Int. Cl.
*G06F 16/185* (2019.01)
*G06F 16/28* (2019.01)

(52) U.S. Cl.
CPC .......... *G06F 16/185* (2019.01); *G06F 16/282* (2019.01)

(58) Field of Classification Search
CPC ................ G06F 16/185; G06F 16/282; G06Q 10/06311; G06Q 10/0631; G06Q 10/06312; G06Q 10/06
See application file for complete search history.

(56) References Cited

U.S. PATENT DOCUMENTS

| | | | | |
|---|---|---|---|---|
| 5,706,456 A | * | 1/1998 | Dupper | G06F 9/451 715/839 |
| 2004/0267595 A1 | * | 12/2004 | Woodings | G06Q 10/06311 705/7.14 |
| 2008/0120129 A1 | * | 5/2008 | Seubert | G06Q 10/10 705/35 |
| 2008/0172415 A1 | * | 7/2008 | Fakhari | G06Q 30/02 |
| 2009/0089132 A1 | * | 4/2009 | Nallapaty | G06Q 10/105 705/320 |
| 2010/0030743 A1 | * | 2/2010 | Lim | G06Q 30/0203 707/758 |
| 2011/0314017 A1 | * | 12/2011 | Yariv | H04L 51/02 707/737 |
| 2012/0239451 A1 | * | 9/2012 | Caligor | G06Q 10/00 705/7.21 |
| 2014/0122355 A1 | * | 5/2014 | Hardtke | G06Q 10/105 705/321 |

(Continued)

*Primary Examiner* — Amresh Singh
*Assistant Examiner* — Fatima P Mina
(74) *Attorney, Agent, or Firm* — DLA Piper LLP (US)

(57) ABSTRACT

Systems and methods for managing data. Person and position data can be copied from a database and it can be determined whether a person is aligned to any positions. Information can be displayed representing the person and indicating any positions to which the person is aligned.

48 Claims, 20 Drawing Sheets

(56) References Cited

U.S. PATENT DOCUMENTS

2014/0172731 A1* 6/2014 Ericksen .............. G06Q 10/105
  705/320
2014/0173699 A1* 6/2014 Daly .................... H04L 63/104
  726/4

* cited by examiner

FIGURE 1: Alignment functionality-related fields
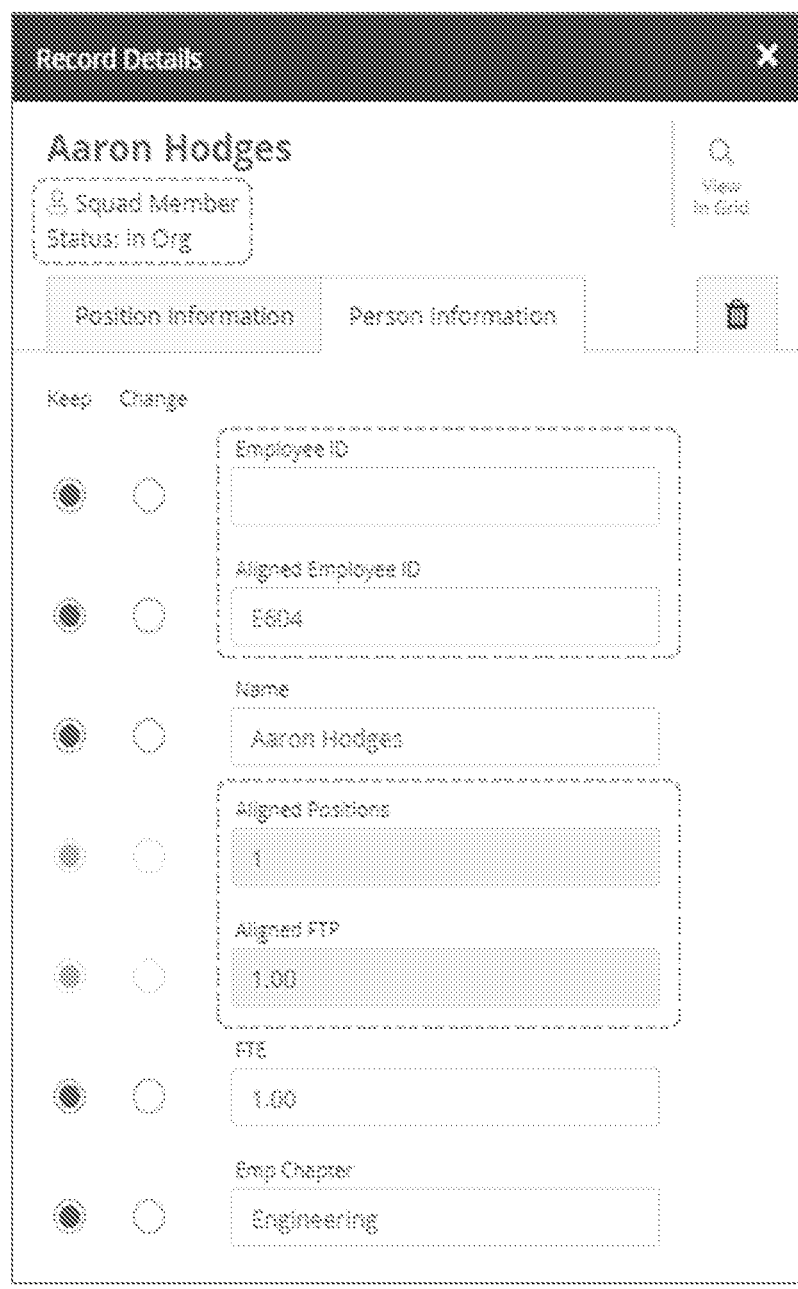

FIGURE 2A: Aligned Positions in the Workspace
205
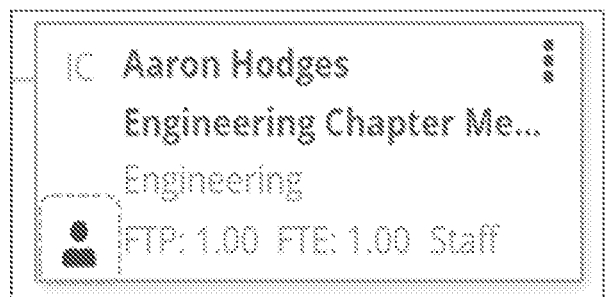
A solid person icon indicates that a person is Staffed in a position
210
A hollow icon indicates that a person is Aligned to a position
215
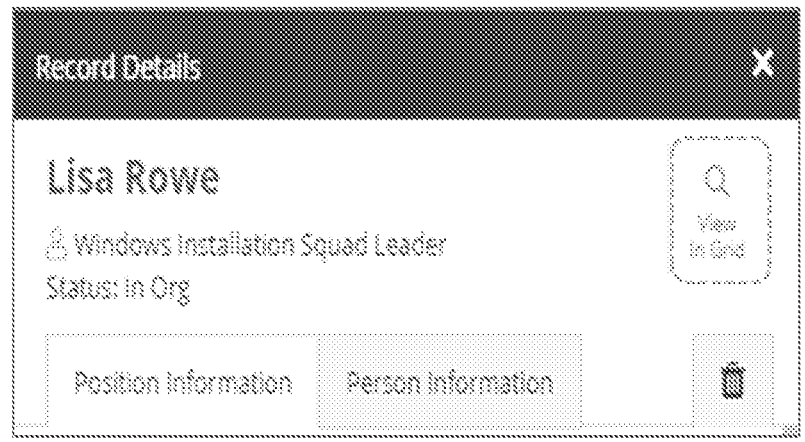

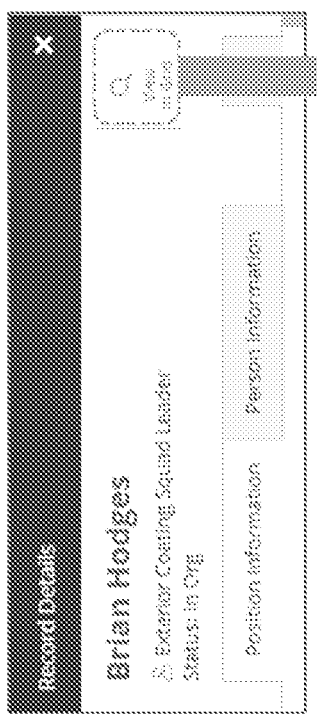
FIGURE 2B: View In Search Grid - (e.g., results displayed in figure 9)

FIGURE 3: Staffing Type Field

305

FIGURE 4: Staffing Type Field Example Formulas and Use Cases

4a. An Agile organization may have a Boolean (T/F) field called "Squad Member" to identify Squad positions.

One can reference the Squad Member field in the Staffing Type formula using a formula such as (GetFieldValue<bool>("SquadMember") == true) ? "Align" : "Staff",)).

The result of this formula would be:

- Any position for which the Squad Member field = True can return "Align"
- All positions for which the Squad Member field <> True can return "Staff". (Note that only the Align result of the Staffing Type formula is shown to the right.)

In some aspects of the disclosure, the actual formula can be (GetFieldValue<bool>("SquadMember") == true) ? "Align" : "Staff",))

4b: An organization in which people fill multiple positions may have a string field called "Primary or Secondary Position" to identify primary and secondary positions.

You can reference the Primary or Secondary Position field in the Staffing Type formula using a formula such as (GetFieldValue<string>("PrimaryorSecondaryPosition" == "Secondary") ? "Align" : "Staff",)).

The result of this formula would be:

- Any position for which the Primary or Secondary Position field = "Secondary" can return "Align"
- All positions for which the Primary or Secondary Position field <> "Secondary" can return "Staff".

FIGURE 5: Align Type Positions - User Interactions
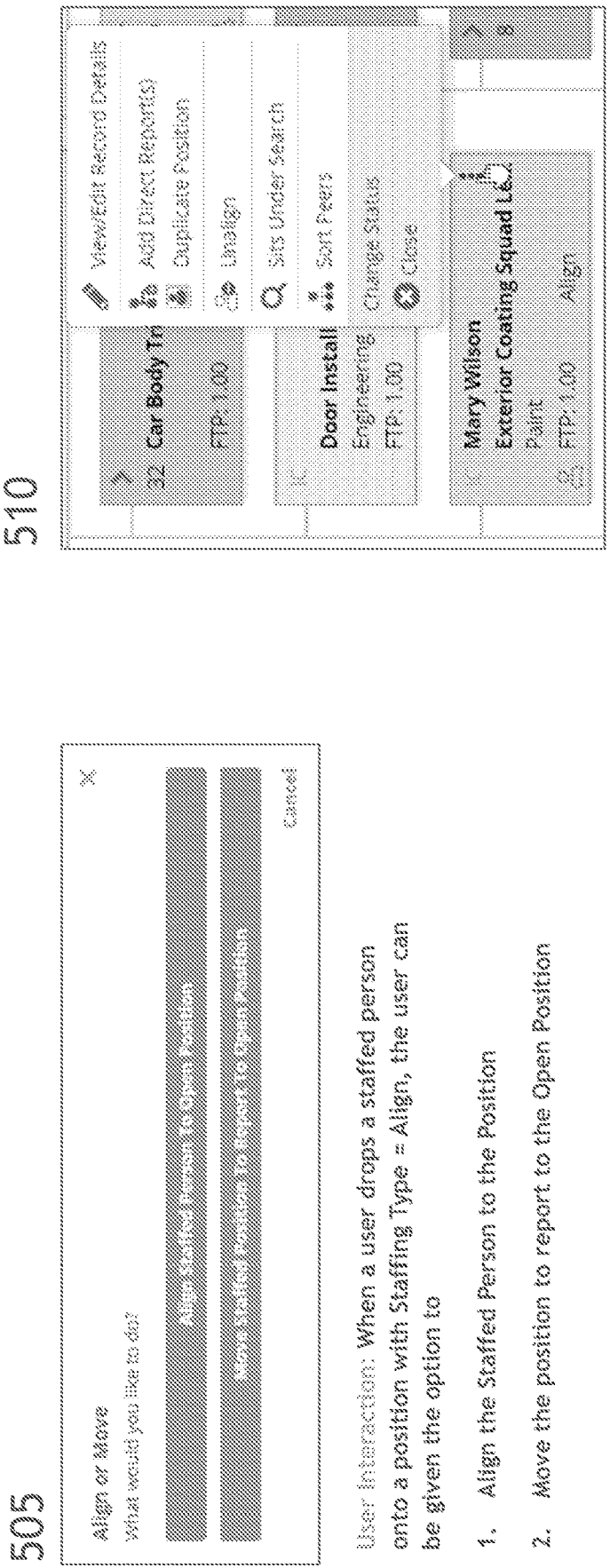

FIGURE 6: Staffing Type Code

Example code below uses a custom formula to determine a position's Staffing Type:

Staffing type can be a property of each position object in the system. And the property can be defined as follows under the class public class PositionTreeNodeDO

```
{
    // Other class properties and methods public string StaffingType
    {
        get { try { return GetFieldValue<string>("StaffingType"); } catch { return null; } }
    }
}
```

The GetFieldValue method can take the property name, can pull up the staffing type formula text from database, or can evaluate the position on the extracted formula, or any combination thereof. For example:

```
public T GetFieldValue<T>(string fieldName)
{
    // other relevant logic.
    if ((!fd.IsCustomCalculated() || fd.IsCustomRollup()) && !string.IsNullOrEmpty(fd.FormulaText))
    {
        If { // other relevant logic. }
        else
        {
            var value = (T)TypeConversionHelper.ChangeType(FormulaHelper.EvalFormula<PositionTreeNodeDO, object>(fd, this),
                typeof(T), false, true); // this is where the formula evaluation happens.
            return value;
        }
    }
}
```

FIGURE 7: Aligned People Code

Code that calculates Aligned FTP, Code that calculates Aligned Positions:

The following example function takes a list of Aligned Positions for a given employee as input parameters along with the employee's full record in a second parameter.

```
private static void SetAlignedPositionsAndAlignedFTP(Dictionary<int, List<PositionTreeNodeDO>> alignedPositionByEmployeeId, EmployeeDO employee)
{
    // If align function is OFF, we don't want to assign any value to AlignedPositions and AlignedFTP
    if (alignedPositionByEmployeeId != null)
    {
        if (alignedPositionByEmployeeId.TryGetValue(employee.Id, out List<PositionTreeNodeDO> alignedPositionNodes))
        {
            employee.AlignedPositions = alignedPositionNodes.Count(); // count the number of positions where employee is aligned
            employee.AlignedFTP = alignedPositionNodes.Sum(x => x.FTP); // do the sum of all FTP values for the positions where employee is aligned
        }
        else
        {
            // other logic
        }
    }
}
```

Code that populates Staffing Type field in Workspace:

Some or all aspects of the application can be driven using the PositionTreeNodeDo Class as defined in Slide 5. In one example aspect of the disclosure, this can be the only place where StaffingType is calculated and assigned to data transfer objects getting sent to Front end using the snippet below.

```
public void BuildBasicProperties()
{
    // other relevant logic
    Branch.StaffingType = BranchDO.StaffingType; // Branch is the object to be sent to Front End in the api call result.
                                                 // BanchDO is the PositionTreeNodeDO object as mentioned above
}
```

FIGURE 8: Aligned People Code

Example code that shows Staff/Align Icon on Position in Org Tree:

```
// pulls up the right image in the html file based on condition icons.isStaffed and icons.isAligned
    <div class="staff-icon-div" ng-if="node.nodeTemplateZones.isIconVisible">
        <img class="exception-icon" ng-if="icons.isStaffed" ng-src="{{icons.staffedIcon}}" />
        <img class="exception-icon" ng-if="icons.isAligned" ng-src="{{icons.alignedIcon}}" />
    </div>

// the logic to decide whether position is staffed or aligned is written in directive which gets injected in the html on page load as follows
function updateIcons() {
    // other relevant logic
    // $scope.node is a unique position in org tree on which we want to decide which icon should be applied
    // if $scope.node.alignedEmployeeId is not 0, set icons.isAligned as true
        $scope.icons.isStaffed = ($scope.node.employeeId != 0 && $scope.node.positionId!=0) ? true : false;
        $scope.icons.isAligned = $scope.node.alignedEmployeeId != 0 && $scope.hasAlignedAccess ? true : false;
}
```

Example code that shows Staff/Align Icon on Position in Edit Panel:

```
// pulls up the right image in the html file based on condition has hasAlignedEmployee and !isUnstaffedPosition (meaning staffed position)
    <img class="edit-icon" ng-if="hasAlignedAccess && !isUnstaffedPosition && !isUnstaffedEmployee" ng-src="{{staffedIcon}}" />
    <img class="edit-icon" ng-if="hasAlignedAccess && hasAlignedEmployee" ng-src="{{alignedIcon}}" />

// the logic to decide whether position is staffed or aligned is written in controller class which gets injected in the html on page load as follows
// meaning if the record being edited has alignedemployeeId > 0 the set property hasAlignedEmployee as true if (!$scope.isBulkEdit && $scope.editDetails.positionEmployeeMetadatas[0].alignedEmployeeId > 0) $scope.hasAlignedEmployee = true;
```

FIGURE 9: Aligned People Code

Example code that Populates Search Grid when "View in Grid" link is clicked:

```
// on clicking on view in grid icon, a function gets called as detailed below.
   <div class="view-in-grid-div" ng-click="onClickViewInGrid()">

// $scope contains all relevant details for the position on which this icon was clicked.
   function viewInSearchGrid() {
       var employeeCodeField;
// below lines check if position is staffed OR aligned and picks up the employee Id tied to that position accordingly in employeeCodeField
       if ($scope.isUnstaffedPosition && $scope.hasAlignedEmployee) {
           employeeCodeField = $scope.getValue(FieldConstants.AlignedEmployeeCode);
       }
       else {
           employeeCodeField = $scope.getValue(FieldConstants.EmployeeCode);
       }
// some other logic and use case handling
// eventually broadcasting and calling the search event which will call certain backend apis in the line below
       $rootScope.$broadcast(Events.VIEW_SEARCH_GRID, employeeCodeField);
   }
```

FIGURE 10: Align-Type Positions in Slating Mode
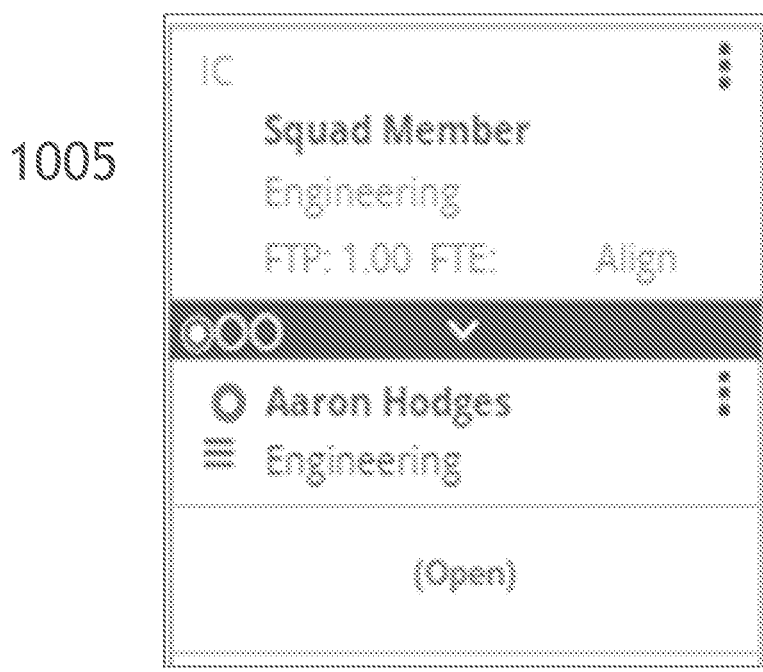
Conflict icon for Align-type positions in Slating Mode

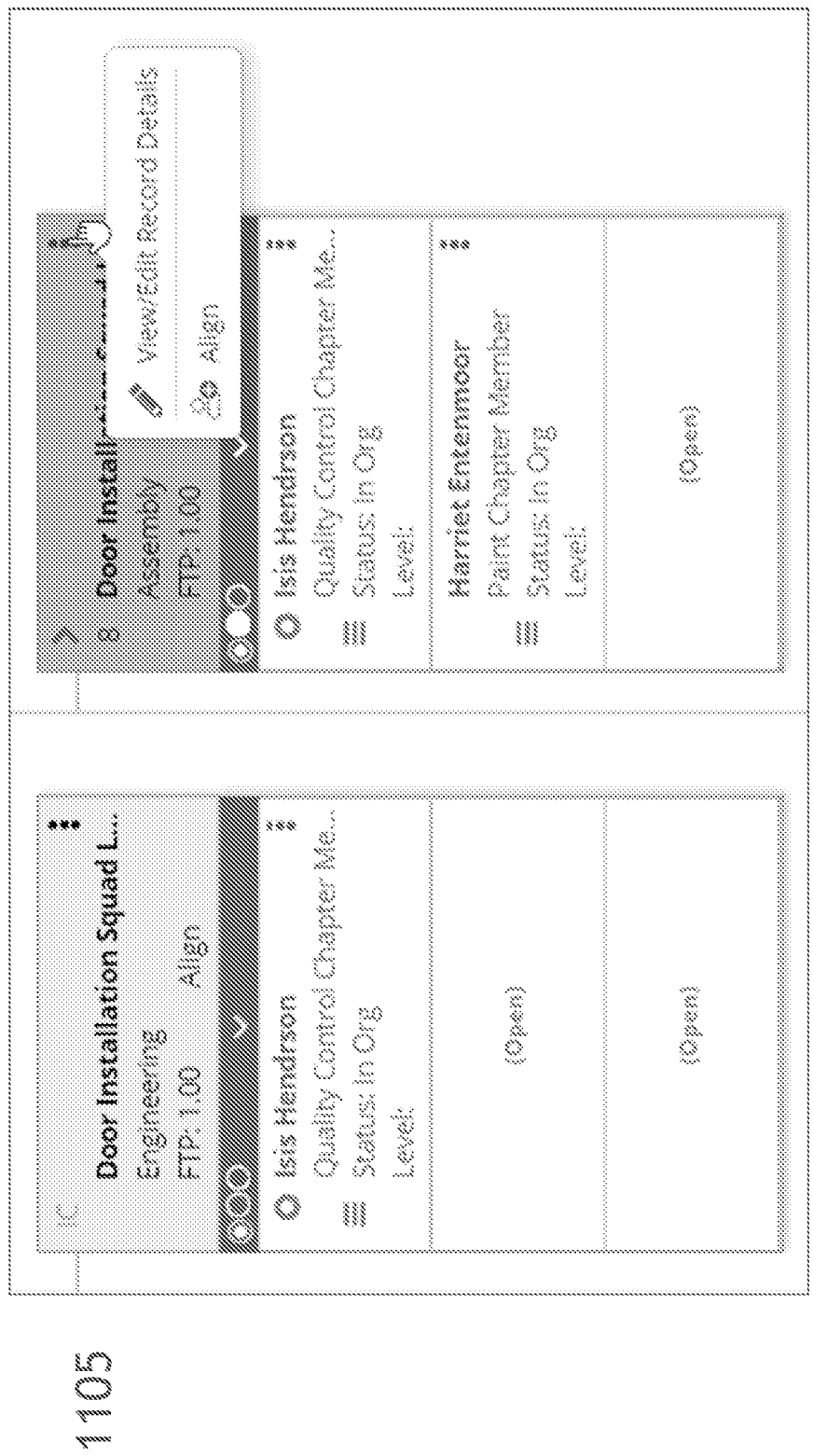
FIGURE 11: Align Type Positions - User Interactions in Slating Mode

FIGURE 12: Align in Slating Mode Code

Example code below can allow user to "Align" a position in Slating Mode:

// the following lines drive the visibility of align icon for a position in state mode. Only if a position staffing type is "align" it will show up based on value of "showSlatingAlign"
```
<div class="section-divider" ng-show="showSlatingAlign" ></ div>
<div class="action" ng-show="showSlatingAlign" ng-click="onOptionClick(options.align)">

$scope.onOptionClick = function (option) {
    //Other relevant logic
    case options.align:
        runMe = launchAlignWizard; // If align button is clicked it will launch a wizard on screen for user to align
        break;
    case options.unalign:
        runMe = launchUnAlignWizard;
        break;
}

// Code snippet for opening the relevant wizard where user gets to choose from various options when aligning.
wizardFactory.openAlignWizard(data).then(function () {
    refreshAndExpandNode();
});
```

FIG. 13: Person (Aaron Hodges) has one position in primary structure

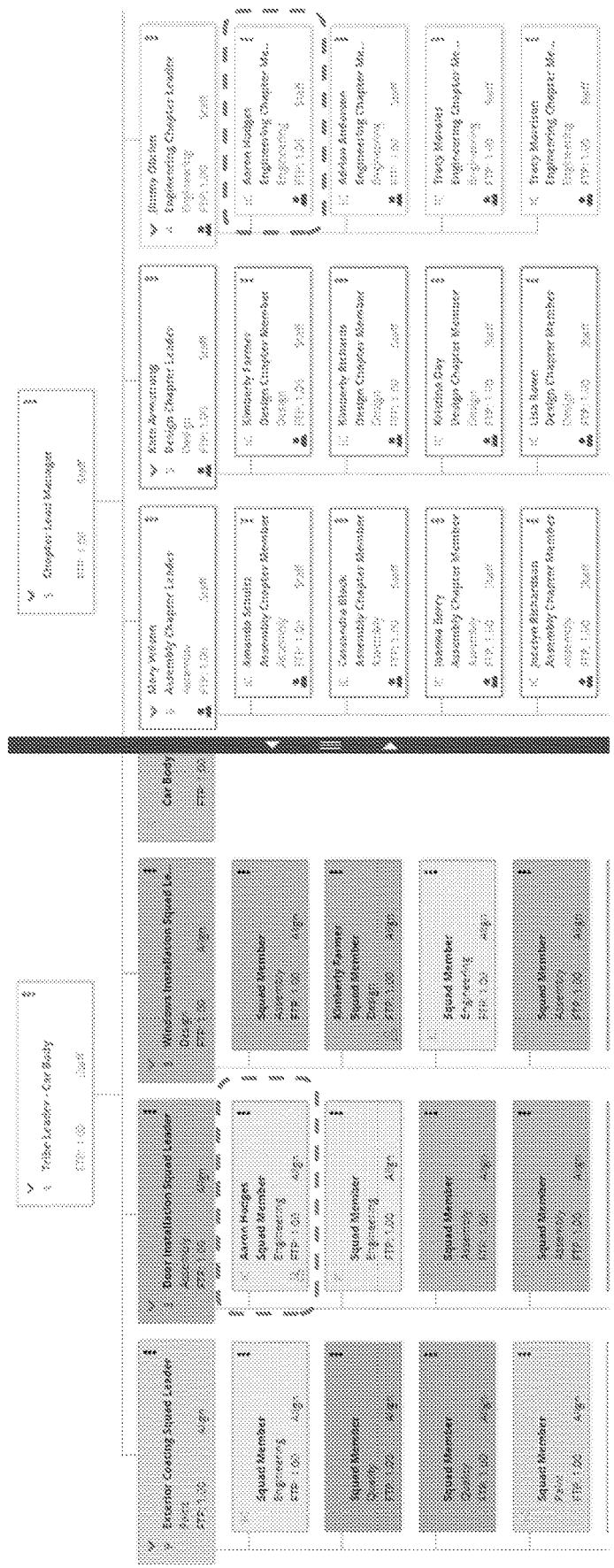
FIG. 14: Person (Aaron Hodges) has one position in primary structure, one position in additional team structure FIG. 15: Person (Aaron Hodges) has one position in primary structure, two positions in additional structures FIGURE 17 - Person Staffing Tracker Note: This report shows only the staffed/unstaffed version of the people that sit under the top node selected. This means that if one owns an unstaffed person or a person staffed in a staff-type position, one can see and track the other positions they may be aligned to. This report may not let one track the staff-type positions that people who are aligned to Align-type positions in the org are staffed in.

FIG. 18 - Person State Tracker - Align Variation

FIGURE 19 - Position Slate Tracker

METHODS AND SYSTEMS FOR ALIGNING

CROSS REFERENCE PARAGRAPH

This application is Continuation of U.S. application Ser. No. 17/398,591 filed on Aug. 10, 2021, which is a Continuation-in-Part to U.S. application Ser. No. 17/384,258 filed Jul. 23, 2021, which claims priority to U.S. Provisional Application 63/056,490, filed Jul. 24, 2020. U.S. application Ser. No. 17/398,591 is also a Continuation-in-Part of U.S. application Ser. No. 16/013,535 filed Jun. 20, 2018, which is a Continuation of U.S. application Ser. No. 14/218,110 filed Mar. 18, 2014 (issued as U.S. Pat. No. 10,037,352), which claims priority to U.S. Provisional Application No. 61/802,884, filed Mar. 18, 2013. U.S. application Ser. No. 17/384,258 is also a Continuation-in-Part of U.S. application Ser. No. 16/013,535 filed Jun. 20, 2018, which is a Continuation of U.S. application Ser. No. 14/218,110 filed Mar. 18, 2014 (issued as U.S. Pat. No. 10,037,352), which claims priority to U.S. Provisional Application No. 61/802,884, filed Mar. 18, 2013. All the forementioned applications (and patents) are incorporated by reference in their entireties.

BRIEF DESCRIPTION OF THE FIGURES

FIG. 1 illustrates alignment functionality-related record fields, according to aspects of the disclosure.

FIGS. 2A-2B illustrates additional information related to displaying aligned and non-aligned positions, and a display in search grid option, according to aspects of the disclosure.

FIG. 3 illustrates details related to the staffing type field, according to aspects of the disclosure.

FIG. 4 illustrates example staffing type formulas and use cases, according to aspects of the disclosure.

FIG. 5 illustrates details related to align type positions and user interactions, according to aspects of the disclosure.

FIG. 6 illustrates example code that can use a formula to determine a position's Staffing Type, according to aspects of the disclosure.

FIG. 7 illustrates example code that can calculate Aligned FTP, example code that can calculate Aligned Position, and example code that can populate a Staffing Type field, according to aspects of the disclosure.

FIG. 8 illustrates example code that can show Staff/Align on a Position in an Org Tree, and example code that can show Staff/Align Icon on a Position in an Edit Panel, according to aspects of the disclosure.

FIG. 9 illustrates example code that can populate a search grid when an appropriate command is used, according to aspects of the disclosure.

FIG. 10 illustrates Align-Type Positions in Slating Mode, according to aspects of the disclosure.

FIG. 11 illustrates example user interactions in slating mode, according to aspects of the disclosure.

FIG. 12 illustrates example code that can allow a user to Align a position in Slating Mode, according to aspects of the disclosure.

FIGS. 13-15 illustrate various example positions and structures, according to aspects of the disclosure.

FIG. 17 illustrates a Person Staffing Tracker, according to aspects of the disclosure.

FIG. 18 illustrates a Person Slate Tracker, according to aspects of the disclosure.

FIG. 19 illustrates details related to a position slate tracker, according to aspects of the disclosure.

DETAILED DESCRIPTION

Figure 16:
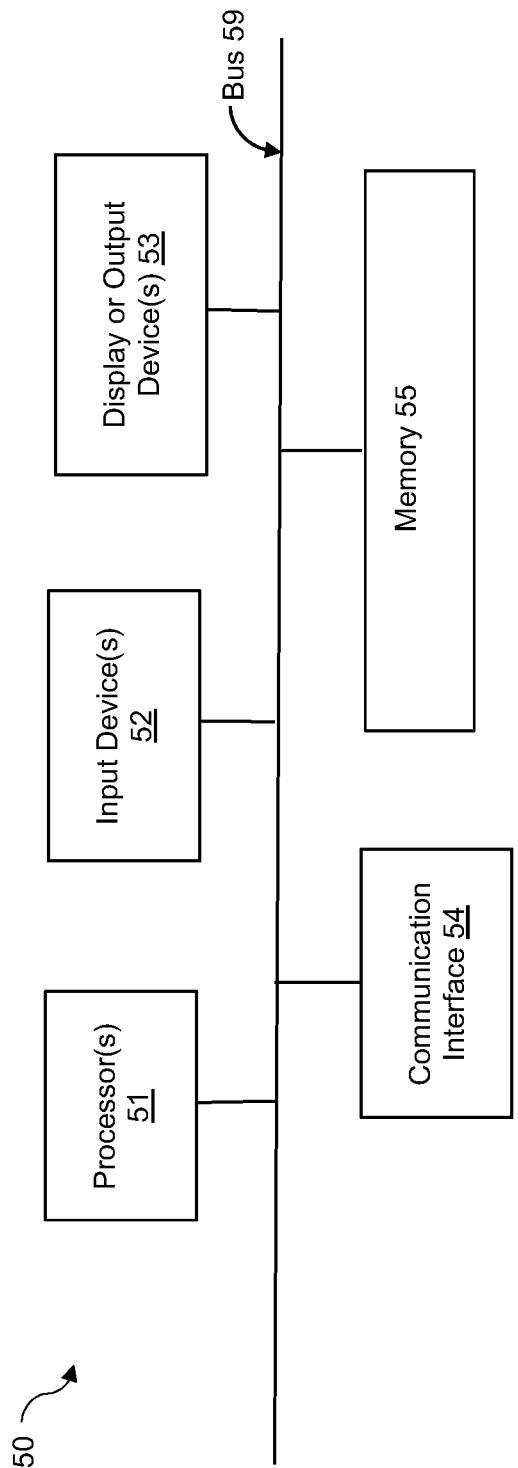
FIG. 16 is a block diagram of an example computing system that may be utilized to execute embodiments to implement processes including various features and functional operations as described herein, according to aspects of the disclosure.

FIG. 1 illustrates alignment functionality-related record fields, according to aspects of the disclosure. The fields in 105 can include employee ID field, a name field, an FTE (full time employment) field indicating full time employment (e.g., 1.0) or part-time employment (e.g., less than 1.0), or an employment chapter (e.g., engineering), or any combination thereof. Any combination of the following other fields can be also used in 105.

Staffing Type: This can be a calculated position field that can use information about a position to determine what kind of relationship a person can have to that position. One can check an open position's Staffing Type to see whether that position can be staffed or aligned.

Aligned Employee ID: Each person record can have a unique identifier, which is typically called "Employee ID." When a person is Staffed in a position, the relationship can be captured by the combination of Position ID and Employee ID. When a person is aligned to a position, OrgBuilder can capture this relationship by placing the person's Employee ID in a new person field called Aligned Employee ID. One can identify Aligned positions in the Edit Panel using the person icon in the top left corner, beside the position's job title. A solid person icon can indicate a Staffed position; a person icon with a dashed outline and no fill can indicate an Aligned position.

Aligned Positions and Aligned FTP: Because a person can be Aligned to multiple positions, OrgBuilder can track the positions each person is aligned to using, for example, two calculated person attributes: Aligned Positions and Aligned FTP. The Aligned Positions field can display a count of the total number of positions to which a person is Aligned. The Aligned FTP (Full Time Position) field can show the sum of the FTP of the positions to which a person is Aligned.

FIGS. 2A-2B illustrates additional information related to displaying aligned and non-aligned positions, and a display in search grid option, according to aspects of the disclosure. Most information about people that are aligned to positions can show up in all of the same places that it does for people that are staffed or unstaffed. The Search Grid, Org Tree, or Edit Panel, or any combination thereof, can use all the same fields (with some exceptions in some aspects of the disclosure), which are explained below.

Searching for any person attribute, aside from Employee ID, can return all staffed and unstaffed people that meet the criteria one enters, as well as any positions to which a person that meets the criteria is Aligned. So, if one searches for a person's name, and that person is aligned to a position, the Search Grid can display one row for the person's staffed/unstaffed record and one or more rows for any positions to which they are aligned.

When looking at a position in the tree, there can be several ways to identify whether a person is Staffed in it or Aligned to it:

In the Org Tree, each position with a template showing at least 3 rows can display a person icon in the lower left corner. A solid person icon (e.g., as shown in 205) can indicate that the position is Staffed. If the icon shows only an outline (e.g., as shown in 210), the person can be "Aligned" to the position. If no icon shows up, the position can be "open."

When viewing a Staffed or Aligned position/person in the Edit Panel, one can see the same icon beside the person's name. If one is viewing a person record (without a corresponding position), the person may be unstaffed.

When viewing a staffed or aligned person in the Edit Panel, one can use the "View in Search Grid" link (e.g., as shown in 215) to quickly search for all instances of the person—the results can return the staffed or unstaffed version of the person, and/or some or all of the positions the person is aligned to. (See, e.g., FIG. 9.)

Pressing the "View in Grid" button (as shown in 220 of FIG. 2B) can run a search that queries the Employee ID and Aligned Employee ID fields for the person's unique Employee ID and return the results in the system's (e.g., OrgBuilder or any other system) Search Grid as shown in 225.

Figure 3:
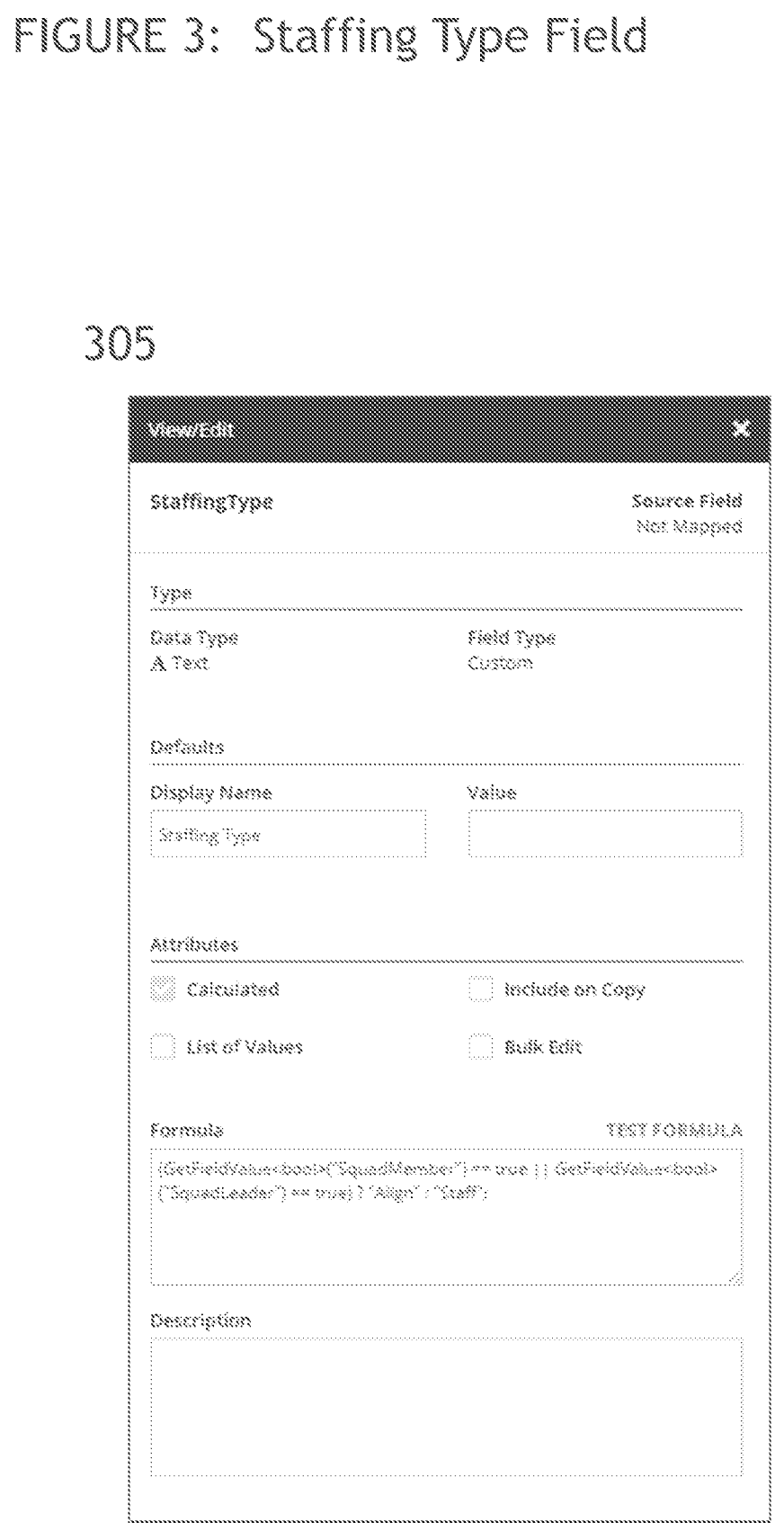

FIG. 3 illustrates details related to the staffing type field, according to aspects of the disclosure. Staffing Type can be a calculated field that uses information about a position to determine what kind of relationship a person can have to that position. Some example outputs of this field include Staff and Align. Any position that does not meet the criteria that would make its Staffing Type "Align," including any positions for which the formula may evaluate to N/A, can result in the position's Staffing Type being set to Staff. To make a position's Staffing Type=Align, the formula for the Staffing Type field formula can specify the criteria a position should meet in order to be Align.

If one is designing primary and secondary positions, one can use a position field to clearly indicate whether the position is primary or secondary, then one can use that field as the basis for a Staffing Type formula. The Staffing Type formula can be customized on a per case basis. The image in 305 shows C# logic for example data.

If a person is currently Staffed in or Aligned to a position, and that position's staffing Type changes, the relationship between the person and the position can remain in place. If a person is Staffed in a position, and the position's Staffing Type changes to Align, the person can remain Staffed until they are unstaffed. If a person is Aligned to a position, and the position's Staffing Type changes to Staff, the person can remain Aligned to the position until they are unaligned. A position can only be filled by one person in some aspects of the disclosure, regardless of whether that person is Staffed or Aligned.

FIG. 4 illustrates example staffing type formulas and use cases, according to aspects of the disclosure. A position's Staffing Type can be either Staff or Align. The output can be the result of the Staffing Type formula. A position that meets the requirements to return "Align" as its Staffing Type, as specified in the formula, will have a Staffing Type of "Align." Any position that does not meet the requirements to return "Align" as its Staffing Type, as specified in the formula, will have a Staffing Type of "Staff."

Two example formulas/results 4a and 4b are shown in FIG. 4. In 4a, the formula relates to squad positions. Record Details 405 indicate that in this position, which can use the StaffingType formula in 4a, the Squad Member field=true, so the staffing type can evaluate to align. In 4b, the formula relates to primary and secondary positions. Note that the examples provided are only a few examples of many options that can be used for various organizations and situations.

FIG. 5 illustrates details related to align type positions and user interactions, according to aspects of the disclosure. In 505, when a user drops a staffed person onto a position with a Staffing Type=Align, the user can be given the following options: aligning the staffed person to an open position; and/or moving the staffed position to report to an open position. As shown in 505, when a person is aligned to a position, the Action Menu can offer an option to Unalign the person and/or re-open the position.

FIG. 6 illustrates example code that can use a formula to determine a position's Staffing Type, according to aspects of the disclosure.

FIG. 7 illustrates example code that can calculate Aligned FTP, example code that can calculate Aligned Position, and example code that can populate a Staffing Type field, according to aspects of the disclosure.

FIG. 8 illustrates example code that can show Staff/Align on a Position in an Org Tree, and example code that can show Staff/Align Icon on a Position in an Edit Panel, according to aspects of the disclosure.

FIG. 9 illustrates example code that can populate a search grid when an appropriate command (e.g., view in grid) is used, according to aspects of the disclosure.

FIG. 10 illustrates Align-Type Positions in Slating Mode, according to aspects of the disclosure. Align-type positions can behave very much like Staff-type positions, with a few differences in some aspects of the disclosure, which can include any combination of the following:

Example conflicts for Align-type positions:
Because people can be aligned to more than one position, conflicts on Align-type positions may prevent one from completing the alignment of the person to the position.
If the #1 candidate for an Align-type position is currently aligned to another position, or if they are slated as the top candidate for another Align-type position, one may see a red circle (or any other color) indicating a conflict. Whereas the icon for Staff-type positions is a solid red dot, the icon for conflicts on Align-type positions may be a red circle with a white center (see, e.g., 1005 of FIG. 10).
If the #1 candidate for an Align-type position is currently staffed in another position, or if they are slated as the top candidate for one or more Staff-type positions, one may not see a conflict on the Align-type position.

Completing Align-type positions: Completing and staffing a Staff-type position in Slating Mode may require that the position be in the organization and in one of the Position Lists. Align-type positions, however, can be completed and aligned even if the position is not in the org—the only requirement may be that the position must be in one of the Position Lists. To complete the Alignment, one can, for example, click the action menu icon on the position, and select Align. (See, e.g., FIG. 12.) One can use the Bulk Actions menu above the search grid to complete and Align (or complete and leave open) multiple positions at the same time. (For example, applying the code in FIG. 12 to multiple positions in a single action.)

FIG. 11 illustrates example user interactions in slating mode, according to aspects of the disclosure. For example, as shown in 1105, a user can Align top slate candidate to an Align Type position using the position's Action Menu (see, e.g., FIG. 12). People can be Aligned to positions even when there is a slating conflict. For example, as also shown in 1105, a conflict icon for Align Positions can be a red circle with a hollow center.

FIG. 12 illustrates example code that can allow a user to Align a position in Slating Mode, according to aspects of the disclosure.

FIGS. 13-15 illustrate various example positions and structures, according to aspects of the disclosure. FIG. 13 illustrates a person with one position in a primary structure.

FIG. 14 illustrates a person with one position in a primary structure, one position in additional team structure. FIG. 15 illustrates a person with one position in primary structure, two positions in additional structures.

Staffing Type Example Details

Staffing Type can be a calculated field that uses information about a position to determine what kind of relationship a person can have to that position. To use Align, one can adjust the formula in the Staffing Type field on the Add/Edit Fields page in the Admin section. The default value in the Staffing Type field is Staff, but Delivery can adjust the formula so that it changes the value to Align for positions with certain attributes. There can be two possible outputs of this field—Staff and Align. Any position that does not meet the criteria that would make its Staffing Type "Align," including any positions for which the formula may evaluate to N/A, can result in the position's Staffing Type being set to Staff.

If one is designing primary and secondary positions, one can use a position field to clearly indicate whether the position is primary or secondary, then use that field as the basis for the Staffing Type formula.

For example: In an Agile organization, one could set up a Boolean (T/F) field called "Squad Position" to identify Squad positions. One could use this field in the Staffing Type formula so any position for which Squad Position=True would return Align; and all others would return Staff (the actual formula would be (GetFieldValue<bool>("SquadPosition")==true) ? "Align": "Staff";))

Because the Staffing Type field can be calculated based on position attributes, it can help to make the formula as simple as possible. When considering which fields should be used in the formula, one can consider how those fields should be shown in the Workspace and how users will interact with them. If the formula relies on a field that users can edit, one can place the editable field(s) near or at the top of the Edit Panel and make the field(s) Lists of Values to control possible inputs. One can also make relevant fields obvious in the org tree either by showing them in box templates or through the use of color via conditional formatting rules.

If using Slating for a project, one can consider leveraging the Staffing Type field as a criterion for the Position Lists. If, for example, one is aligning people to secondary positions only, using Align in the Position List criteria can help ensure that only Align-type positions show up as positions that can be slated.

If a person is currently Staffed in or Aligned to a position, and that position's staffing Type changes, the relationship between the person and the position can remain in place. If a person is Staffed in a position, and the position's Staffing Type changes to Align, the person can remain Staffed until they are unstaffed. If a person is Aligned to a position, and the position's Staffing Type changes to Staff, the person can remain Aligned to the position until they are unaligned. A position may only be able to be filled by one person, regardless of whether that person is Staffed or Aligned.

Align People to Positions Example Details

Once can use an Align People to Positions page in the Admin section to align or unalign people to/from positions in bulk. To use this functionality, one can export the Excel template by clicking the link at the top of the page, and fill in the Position ID and Aligned Employee ID columns. To unalign a person from a position, one can enter the Position ID and leave the Aligned Employee ID blank.

When using this import, OrgBuilder can apply the following example validations. If a row fails one or more of these validations, an error file can be generated with the reason(s) for the failure. Examples include:

Each Position ID can appear only once in the import sheet
Employee IDs can appear multiple times (once per position to which the person should be aligned)
The position's Staffing Type must be Align
The position is open (not currently staffed or aligned)
Positions cannot be aligned when they are locked in a Scenario
The Position ID and Employee ID must exist in the system (one can't add a new person or position via this import)

If a position has been Completed in Slating Mode, aligning or un-aligning a person to/from it with this import can change the position's Slating Status to the appropriate non-completed status. People can be aligned to multiple positions, but only staffed in one in some aspects of the disclosure.

One can work with the OrgBuilder Delivery team to create an exception that flags instances where a person's relationship to a position is not the same as the position's Staffing Type (e.g., a person is staffed in an Align-type position or vice versa).

Span of Control (SOC) calculations may not distinguish attributes of aligned people from those of staffed people. So, changing the SOC calculation to use Sum of FTEs can result in Aligned people being counted multiple times. For example, Person A's FTE=1. Person A is staffed in a position and aligned to another position, both of which report to the same manager. If Span of Control is calculated using Sum of FTEs, the manager's SOC would count the staffed instance of Person A as 1 and the aligned instance of person A as 1, resulting in a span of control of 2. For this reason, it can be helpful to avoid using Sum of FTEs in SOC calculations when dealing with Align-type position.

Aligned Employee ID, Aligned Positions, and Aligned FTP Additional Example Details Each person record can have a unique identifier, which can be called "Employee ID." When a person is Staffed in a position, the relationship can be captured by the combination of Position ID and Employee ID.

When a person is Aligned to a position, OrgBuilder can capture this relationship by placing the person's Employee ID in a new person field called Aligned Employee ID.

One can identify Aligned positions in the Org Tree using the person icon in the lower left corner of the position box. A solid person icon can indicate a Staffed position; a person icon with a dashed outline and no fill can indicate an Aligned position.

Because a person can be Aligned to multiple positions, OrgBuilder can track capacity demands on a person with two new standard calculated person fields. The Aligned Positions field can display a count of the total number of positions to which a person is Aligned. The Aligned FTP field can show the sum of the FTP of the positions to which a person is Aligned. These fields can be updated whenever a person is Aligned to or un-aligned from a position, and can be used like any other field. One can show them in the Edit Panel, in the Org Tree, etc.

The way teams choose to manage demand on a person's capacity may vary between projects, but can be managed using FTP in some embodiments. Some projects may want Staffed (Chapter) positions to have FTP value of 1, and manage Aligned (Squad) Positions' FTPs individually. In this approach, the sum of a person's Aligned FTP and Staffed FTP may not be no more than 2× the person's FTE. In other cases, teams may want to manage Staffed FTP and Aligned FTP together (e.g., Staffed Position FTP=0.2, Aligned FTP=0.8). Using this approach, the combined FTP of a person's Staffed and Aligned positions may not exceed their FTE value In either approach, one can create a calculated field and/or exception that flags people for whom the sum of their Staffed FTP and Aligned FTP exceed the limit determined by the case team.

Person Staffing Tracker Example Details

FIG. 17 illustrates a Person Staffing Tracker, according to aspects of the disclosure. This can be a Design report used to monitor the status of all staffed and unstaffed people in an org. The Staffed People table can illustrate how many people under the selected top node are Staffed, and the status of the position they are Staffed in. It can further divides Staffed people into those that are Aligned to other positions, and those that are not Aligned to any other positions. The Closed/Aligned cell can highlight people that are staffed in Closed positions, but can still be Aligned to positions somewhere in the org.

The Unstaffed People table can illustrate the total number of people that are unstaffed, and can further divide them into people that are On Hold and people that have been marked as exited from the organization. The Exited/Aligned cell can highlight people that have been exited but are still Aligned to positions somewhere in the org.

The Detailed Data table shows example information about every person in the population selected. One can click any cell in the summary table to filter the Detailed Data Table. One can click any person's name to open the Staffing and Alignment Details window, which can show all positions a person fills (e.g., their staffed position, and any positions to which they are Aligned), as well as the status of those positions.

This report shows only the staffed/unstaffed version of the people that sit under the top node selected. This means that if one owns an unstaffed person or a person staffed in a staff-type position, one can see track the other positions they may be aligned to. This report does not let one track the staff-type positions that people who are aligned to Align-type positions in the org are staffed in.

Person Slate Tracker—Align Variation Example Details

Figure 18:
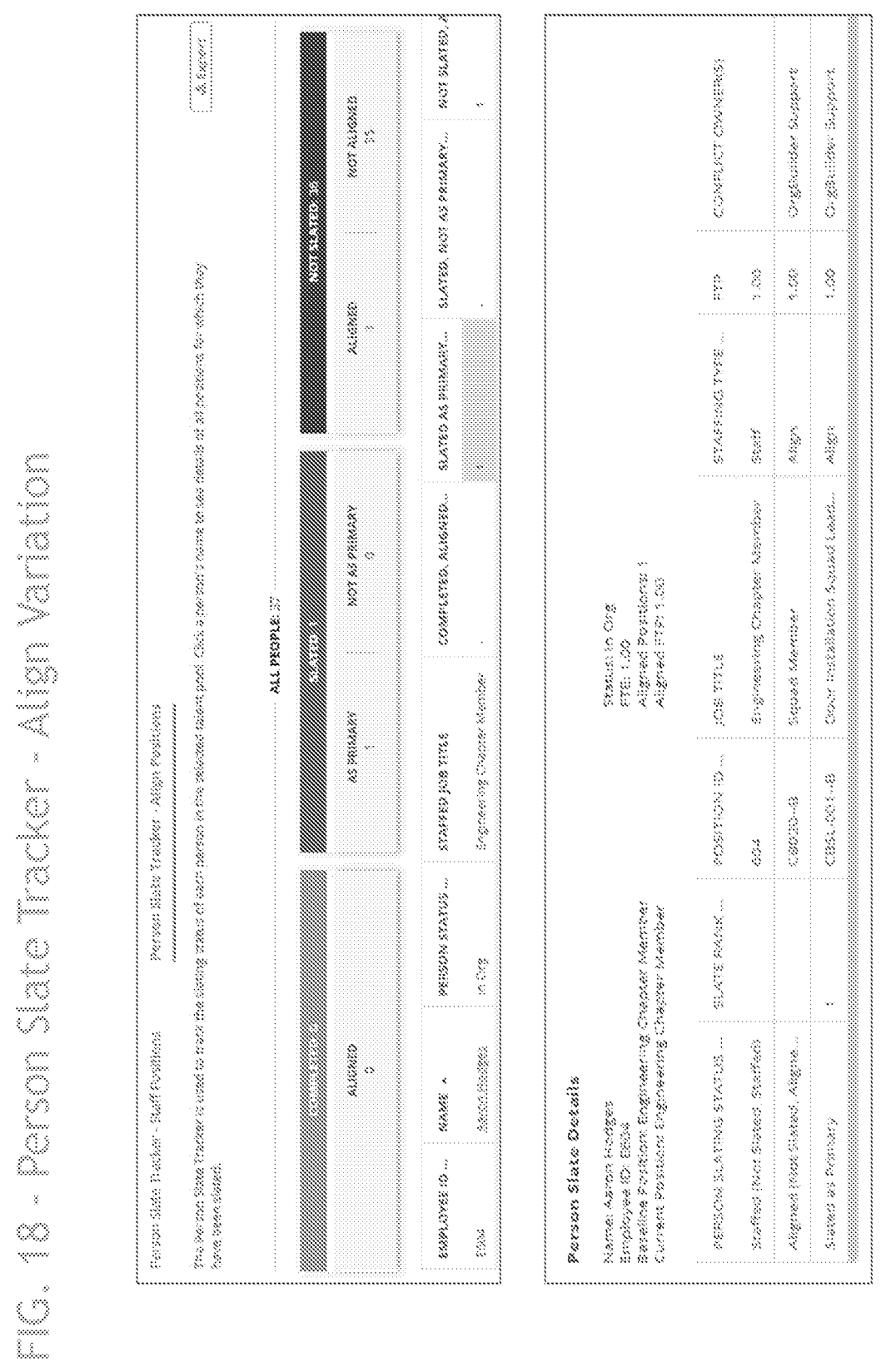

FIG. 18 illustrates a Person Slate Tracker, according to aspects of the disclosure. When using the Alignment functionality, the Person Slate Tracker can have a second variation, which one can navigate to using the tabs at the top of the report. The variation called Person Slate Tracker—Staff Positions can be used to track people as they are slated for Staff-type positions. The Person Slate Tracker—Align Positions variation can show how the people in a talent pool are distributed among slates for Align-type positions.

Each column can show how many positions a person is slated for, and their slating status as it relates to that position. The Completed, Aligned column can show the total number of positions a person has been Aligned to via Slating mode. The Slated as Primary column can show the count of Align-type positions for which a person is slated as the primary candidate, but that have not yet been completed. The Slated, Not as Primary column can show the number of positions for which a person is slated, but not as the primary candidate. A number in the Not Slated, Aligned column can indicate that the person has been Aligned to one or more positions outside of Slating Mode. The Not Slated, Not Aligned column can show a 1 if a person is not slated for any Align-type positions, and also not Aligned to any positions.

The Person Slate Details window can show information about each position a person is Staffed in, Aligned to, and Slated for. Each row can show: the person's Slating Status as it relates to a particular position, their rank on the position's slate, the Position ID, Job Title, Staffing Type, and FTP of the position, or conflict owner information if the person is in conflict for a given position, or any combination thereof.

Position Slate Tracker Example Details

Figure 19:
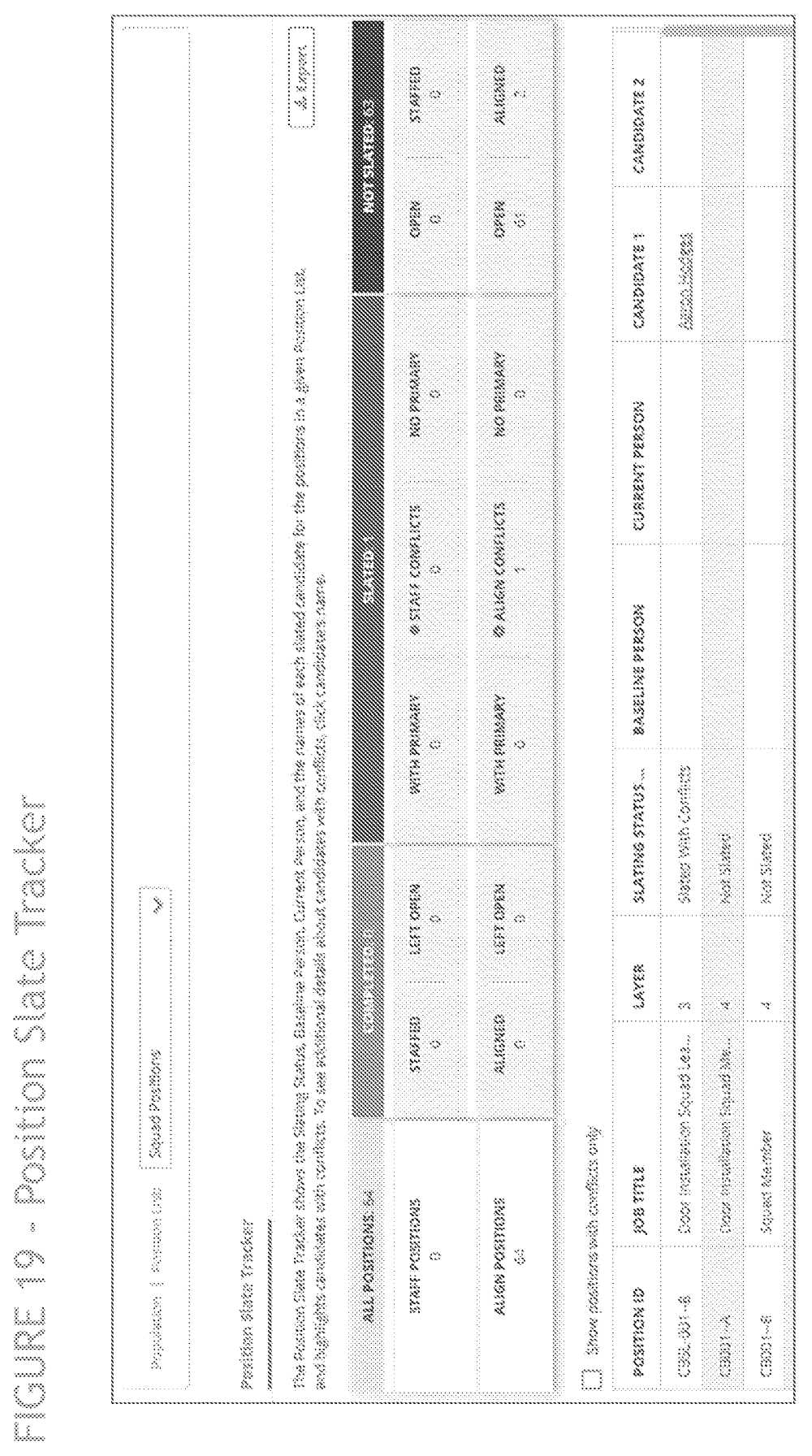

FIG. 19 illustrates details related to a position slate tracker, according to aspects of the disclosure. The Position Slate Tracker can be used to monitor the status of positions in the Position List selected in the Population bar at the top of page.

This report can have two rows for tracking progress on the selected Position List. The top row can track progress for Staff-type positions, and the bottom row can show progress for Align-type positions. The colored boxes can show the current slating status of those positions, such as:

Completed>Staffed/Aligned: Positions that have been staffed/aligned and completed in Slating Mode.

Completed>Left Open: Positions that have been completed and left open in Slating Mode.

Slated>With Primary: Positions with a primary candidate that does not have any conflicts Slated>Conflicts: Positions with a conflict on the primary candidate Slated>No Primary: Positions with no primary candidate.

Not Slated>Open: Positions with no candidates slated and no person currently staffed Not Slated>Staffed: Positions with no candidates slated that are currently staffed.

The table in FIG. 19 can contain contextual information about each position and the names of candidates slated for it. A person's name in red text can indicate a slating conflict on that person. One can use the checkbox above the table to filter for only positions with conflicts.

Clicking a person's name (if underlined and highlighted in red) can bring up the Person Slate Details window, in which one can view information about the person's baseline and current position, and see each position a person is Staffed in, Aligned to, and Slated for. Each row can show the person's Slating Status as it relates to a particular position, their rank on the position's slate, the Position ID, Job Title, Staffing Type, and FTP of the position, or conflict owner information if the person is in conflict for a given position, or any combination thereof.

One can sort the table by clicking on any column header, and export the data to Excel using the Export button at the top right.

Additional Example Details

Methods and systems are disclosed for managing data comprising: performing processing associated with copying, with a data management module in communication with a processor, person and position data from a database; performing processing associated with designating a person as staffed in at least one position and/or aligned to at least one position; and performing processing associated with displaying the person as aligned to multiple positions.

A person can be staffed in only one position and aligned to at least one additional position. The person may not be staffed in any position and may be aligned to at least one position. The data can be hierarchical data, and can be used to represent a person's primary team structure.

A person's primary team structure can comprise the person's administrative reporting relationship in the structure. The person can have one or more positions in the person's primary team structure. The person can have one or more positions in additional team structures to which the person is aligned. The hierarchical data can be used to represent additional team structures to which the person is aligned. the additional team structures can be hierarchical structures. The hierarchical data can be used to represent non-hierarchical groups of people in the additional structures.

When a person is aligned to a position, the person's employee ID can be placed in a person field designated as an aligned employee ID. A solid person icon can indicate a staffed position and a dashed person icon can indicate an aligned position. (Many other icons, symbols, or methods can be used to indicated staffed positions versus aligned positions.)

An aligned position field can display a count of the total number of positions to which a person is aligned. An aligned full time position field can indicate a sum of full time positions or non-full time positions to which a person is aligned. For example, a full time position can have a value of 1, and a non-full time position can have a value of less than 1. (Many other methods can be used to indicate this sum.)

A search for a person's identification information can return any position to which the person is staffed and any position or positions to which the person is aligned when the person is not staffed to any position, the search can return an unstaffed person record plus any position or positions to which the person is aligned. A search for a person who is aligned to a position can query an employee ID field and an aligned employee ID field.

The staffing type can be a calculated field that uses information about a position to determine a relationship a person can have to that position. A formula in a position's staffing type field can specify criteria the position must meet in order to be an align position. If the position does not meet the criteria, the position can be set as a staff position. The formula can be customized to apply to all positions.

When a user drops a person onto an open align position, the user can align the person to the position or the person is moved to report to an open position. A person can be designated as a top candidate on a position slate, and the user can align that person to that position.

Example Computing System

FIG. 16 is a block diagram of an example computing system 50 that may be utilized to execute embodiments to implement processes including various features and functional operations as described herein, according to aspects of the disclosure. For example, a computing device may function as an application server, computing devices or any combination thereof in some embodiments. The computing system may use any electronic device to execute software applications derived from program instructions for the systems and methods described in FIGS. 1-15. Various computing devices may be used, including, but not limited to personal computers, servers, smart phones, media players, electronic tablets, game consoles, mobile devices, email devices, etc. In some implementations, the computing device may include one or more processors 51, one or more input devices 52, one or more display or output devices 53, one or more communication interfaces 54, and memory 55. Each of these components may be coupled by bus 49, or in the case of distributed computer systems, one or more of these components may be located remotely and accessed via a network.

Processor(s) 51 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more non-transitory computer-readable storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input device 52 may be any known input device technology, including but not limited to a keyboard (including a virtual keyboard), mouse, track ball, and touch-sensitive pad or display. To provide for interaction with a user, the features and functional operations described in the disclosed embodiments may be implemented on a computer having a display device 53 such as a CRT (cathode ray tube) or LCD (liquid crystal display) monitor for displaying information to the user and a keyboard and a pointing device such as a mouse or a trackball by which the user can provide input to the computer. Display device 53 may be any known display technology, including but not limited to display devices using Liquid Crystal Display (LCD) or Light Emitting Diode (LED) technology.

Communication interfaces 54 may be configured to enable computing devices to communicate with other computing or network device across a network, such as via a wired connection, a wireless connection, or a combination of wired and wireless connections. For example, communication interfaces 44 may include an Ethernet interface, an optical interface, a coaxial interface, an infrared interface, a radio frequency (RF) interface, a universal serial bus (USB) interface, a Wi-Fi interface, a cellular network interface, or the like.

Memory 55 may be any computer-readable medium that participates in providing computer program instructions and data to processor(s) 51 for execution, including without limitation, non-volatile storage media (e.g., optical disks, magnetic disks, flash drives, etc.), or volatile storage media (e.g., SDRAM, ROM, etc.). Memory 55 may include various non-transitory computer-readable instructions for implementing an operating system 56 (e.g., Mac OS®, Windows®, Linux), network communication 57, and Application(s) and program modules, etc. The operating system may be multi-user, multiprocessing, multitasking, multithreading, real-time, and the like. The operating system may perform basic tasks, including but not limited to: recognizing input from input device 52; sending output to display device 53; keeping track of files and directories on memory 55; controlling peripheral devices (e.g., disk drives, printers, etc.) which can be controlled directly or through an I/O controller; and managing traffic on bus 49. Bus 49 may be any known internal or external bus technology, including but not limited to ISA, EISA, PCI, PCI Express, NuBus, USB, Serial ATA or FireWire.

Network communications instructions may establish and maintain network connections (e.g., software applications for implementing communication protocols, such as TCP/IP, HTTP, Ethernet, telephony, etc.).

Application(s) and program modules may include software application(s) and different functional program modules which are executed by processor(s) 41 to implement the processes described herein and/or other processes. The program modules may include but not limited to software programs, objects, components, data structures that are configured to perform particular tasks or implement particular data types. The processes described herein may also be implemented in operating system 46.

Communication between various network and computing devices may be facilitated by one or more application programming interfaces (APIs). APIs of system 400 may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and application servers. A user or client computing device and server may generally be remote from each other and may typically interact through a network. The relationship of client computing devices and server may arise by virtue of computer programs running on the respective computers and having a client-server relationship to each other.

CONCLUSION

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown. In particular, the elements of any flowchart or process figures may be performed in any order and any element of any figures may be optional.

Although the term "at least one" may often be used in the specification, claims and drawings, the terms "a", "an", "the", "said", etc. also signify "at least one" or "the at least one" in the specification, claims and drawings. The terms "including" and "comprising" and any similar terms should be interpreted as "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computerized method for managing data comprising:
   performing processing associated with copying, with a data management module in communication with a processor, person and position data from a database;
   performing processing associated with determining whether a person is aligned to any positions, comprising:
   performing processing associated with querying information in a database related to the person and positions;
   performing processing associated with using the information in the database related to the person and the positions to calculate how to populate fields for the positions, wherein a type field specifies align criteria a position must meet in order to be an align-type position; and
   performing processing associated with designating the person as aligned to the position upon calculating that type field information does meet the align criteria for the position; and
   performing processing associated with displaying person information and indicating any positions to which the person is designated as aligned;
   wherein hierarchical data is used to represent a person's primary team structure and non-hierarchical groups of people in additional team structures;
   wherein position information is used to determine a relationship the person has to each position, and wherein each position is compared to a formula to determine whether each position is an aligned position;
   wherein a person slate tracker is used to track people as they are slated for align-type positions and/or staff-type positions, and/or a position slate tracker is used to track positions with respect to their slating status; and
   wherein when the person is designated as aligned to the position, a person's employee ID is placed in a person field designated as an aligned employee ID, and a relationship is captured by a combination of a position ID and the person's employee ID by placing the person's employee ID in a new person field called aligned employee ID, and wherein any positions each person is aligned to are tracked using aligned positions and aligned full time positions (FTPs), wherein an aligned positions field shows a count of a total number of positions to which the person is aligned, and an aligned FTP field shows a sum of FTPs to which the person is aligned.

2. The method of claim 1, wherein each column in the person slate tracker displays how many positions the person is slated for, and a person's slating status as it relates to that position.

3. The method of claim 1, wherein a slated as primary column shows a count of align-type positions for which the person is slated as a primary candidate.

4. The method of claim 1, wherein the person is designated as having one or no positions in a person's primary team structure.

5. The method of claim 4, wherein the person's primary team structure comprises a person's administrative reporting relationship in the person's primary team structure.

6. The method of claim 1, wherein the person is designated as having at least one position in additional team structures to which the person is aligned.

7. The method of claim 1, wherein the hierarchical data is used to represent additional team structures with positions to which the person is designated as aligned or the positions in the person's primary team structure to which the person is designated as aligned.

8. The method of claim 1, wherein a type of icon representing the person indicates that the person is aligned.

9. The method of claim 1, wherein columns in the person slate tracker show a number of positions for which the person is: not slated and aligned, not slated and not aligned, completed and aligned, slated as primary, or slated not as primary, or any combination thereof.

10. The method of claim 1, wherein an aligned positions field indicates a count of any full time positions and/or non full time positions to which the person is aligned.

11. The method of claim 10, wherein the aligned positions field shows a value of 0 when the person is not aligned to any position.

12. The method of claim 1, wherein a search for a person's identification information returns any position to which the person is designated as aligned.

13. The method of claim 12, wherein a search for the person who is designated as aligned to the position queries an employee ID field or an aligned employee ID field.

14. The method of claim 1, further comprising:
performing processing associated with displaying icons representing the person on a computer screen, the icons indicating any positions to which the person is designated as aligned.

15. The method of claim 1,
wherein when a user puts a person onto an open align-type position, the user aligns the person to the position or the person is moved to report to the open align-type position.

16. The method of claim 1,
wherein when the person is designated as a top candidate on a position slate, a user can align the person to that position.

17. The method of claim 1,
wherein a search for a person who is designated as aligned to a position queries an employee ID field and an aligned employee ID field.

18. The method of claim 1, wherein a number in a not slated, aligned column indicates that the person is aligned to one or more positions outside of slating mode.

19. The method of claim 1, wherein a not slated, not aligned column indicates when the person is not slated for any align-type positions and also not aligned to any positions.

20. The method of claim 1, wherein a person slate details window shows position type information about each position the person is: staffed in, aligned to, or slated for, or any combination thereof.

21. The method of claim 20, wherein each row of the person slate details window shows: a person's slating status as it related to a particular position, a person's rank on a position slate, a person's ID, a person's job title, a person's staffing type, a person's FTP of the position, or conflict owner information if the person is in conflict for a given position, or any combination thereof.

22. The method of claim 1, wherein a staffing type is a calculated field that uses position information to determine a relationship the person is able to have to the position.

23. The method of claim 22, wherein when the position does not meet the criteria for an align-type position, the position is set as a staff-type position.

24. The method of claim 1, wherein the formula is a centrally configured formula.

25. A system for managing data comprising:
a memory; and
a processor configured for:
performing processing associated with copying, with a data management module in communication with a processor, person and position data from a database;
performing processing associated with determining whether a person is aligned to any positions, comprising:
performing processing associated with querying information in a database related to the person and positions;
performing processing associated with using the information in the database related to the person and the positions to calculate how to populate fields for the positions, wherein a type field specifies align criteria a position must meet in order to be an align-type position;
performing processing associated with designating the person as aligned to the position upon calculating that type field information does meet the align criteria for the position; and
performing processing associated with displaying person information and indicating any positions to which the person is designated as aligned;
wherein hierarchical data is used to represent a person's primary team structure and non-hierarchical groups of people in additional team structures;
wherein position information is used to determine a relationship the person has to each position, and wherein each position is compared to a centrally configured formula to determine whether each position is an aligned position;
wherein a person slate tracker is used to track people as they are slated for align-type positions and/or staff-type positions, and/or a position slate tracker is used to track positions with respect to their slating status; and
wherein when the person is designated as aligned to the position, a person's employee ID is placed in a person field designated as an aligned employee ID, and a relationship is captured by a combination of a position ID and the person's employee ID by placing the person's employee ID in a new person field called aligned employee ID, and wherein any positions each person is aligned to are tracked using aligned positions and aligned full time positions (FTPs), wherein an aligned positions field shows a count of a total number of positions to which the person is aligned, and an aligned FTP field shows a sum of FTPs to which the person is aligned.

26. The system of claim 25, wherein each column in the person slate tracker displays how many positions the person is slated for, and a person's slating status as it relates to that position.

27. The system of claim 25, wherein a slated as primary column shows a count of align-type positions for which the person is slated as a primary candidate.

28. The system of claim 25, wherein the person is designated as having one or no positions in a person's primary team structure.

29. The system of claim 25, wherein the person is designated as having at least one position in additional team structures to which the person is aligned.

30. The system of claim 25, wherein the hierarchical data is used to represent additional team structures with positions to which the person is designated as aligned or the positions in the person's primary team structure to which the person is designated as aligned.

31. The system of claim 25, wherein a type of icon representing the person indicates that the person is aligned.

32. The system of claim 25, wherein columns in the person slate tracker show a number of positions for which the person is not slated and aligned, not slated and not aligned, completed and aligned, slated as primary, or slated not as primary, or any combination thereof.

33. The system of claim 25, wherein an aligned positions field indicates a count of any full time positions and/or non full time positions to which the person is aligned.

34. The system of claim 33, wherein the aligned positions field shows a value of 0 when the person is not aligned to any position.

35. The system of claim 25, wherein a search for a person's identification information returns any position to which the person is designated as aligned.

36. The system of claim 35, wherein a search for the person who is designated as aligned to the position queries an employee ID field or an aligned employee ID field.

37. The system of claim 25, wherein the processor is further configured for:
performing processing associated with displaying icons representing the person on a computer screen, the icons indicating any positions to which the person is designated as aligned.

38. The system of claim 25, wherein when a user puts a person onto an open align-type position, the user aligns the person to the position or the person is moved to report to the open align-type position.

39. The system of claim 25, wherein when the person is designated as a top candidate on a position slate, a user can align the person to that position.

40. The system of claim 25, wherein a search for a person who is designated as aligned to a position queries an employee ID field and an aligned employee ID field.

41. The system of claim 25, wherein a number in a not slated, aligned column indicates that the person is aligned to one or more positions outside of slating mode.

42. The system of claim 25, wherein a not slated, not aligned column indicates when the person is not slated for any align-type positions and also not aligned to any positions.

43. The system of claim 25, wherein a person slate details window shows position type information about each position the person is: staffed in, aligned to, or slated for, or any combination thereof.

44. The system of claim 43, wherein each row of the person slate details window shows: a person's slating status as it related to a particular position, a person's rank on a position slate, a person's ID, a person's job title, a person's staffing type, a person's FTP of the position, or conflict owner information if the person is in conflict for a given position, or any combination thereof.

45. The system of claim 25, wherein a staffing type is a calculated field that uses position information to determine a relationship the person is able to have to the position.

46. The system of claim 45, wherein when the position does not meet the criteria for an align-type position, the position is set as a staff-type position.

47. The system of claim 25, wherein the person's primary team structure comprises a person's administrative reporting relationship in the person's primary team structure.

48. The system of claim 25, wherein the formula is a centrally configured formula.

* * * * *